United States Patent
Howell et al.

[15] 3,681,357
[45] Aug. 1, 1972

[54] 2-CHLORO-11-(PIPERAZINYL)DIBENZ[bf][1,4]OXAZEPINE AND ACID ADDITION SALTS THEREOF

[72] Inventors: Charles Frederick Howell, Upper Saddle River; Robert Allis Hardy, Jr., Ridgewood, both of N.J.; Nicanor Quinones Quinones, New York, N.Y.

[73] Assignee: American Cyanamid Company, Stamford, Conn.

[22] Filed: April 6, 1970

[21] Appl. No.: 26,115

Related U.S. Application Data

[63] Continuation-in-part of Ser. No. 551,544, May 20, 1966, abandoned, which is a continuation-in-part of Ser. No. 348,271, Feb. 28, 1964, abandoned.

[52] U.S. Cl............260/268 TR, 260/268 R, 424/250
[51] Int. Cl.........................C07d 51/70, A61u 27/00
[58] Field of Search................................260/268 TR

[56] References Cited

UNITED STATES PATENTS 3,546,226  12/1970  Schmutz et al. .........260/268 TR
3,412,193  11/1968  Coppola....................260/268 X
3,444,169  5/1969   Howell.........................260/268
3,539,573  11/1970  Schmotz......................260/268

OTHER PUBLICATIONS

Wolpert et al. Jour. Clin. Pharmac. May– June 1970 p. 175– 181
Gallant et al. Current Therapeutic Res. Vol. 13 p. 364– 368 (1971)
Schmutz et al. Helv. Chim. Acta. Vol. 50 p. 245– 254 (1967)

*Primary Examiner*—Donald G. Davis
*Attorney*—Ernest Y. Miller

[57] ABSTRACT

The preparation of 2-chloro-11-(1-piperazinyl)dibenz-[b,f][1,4]oxazepine by heating ethyl 4-{[o-(p-chlorophenoxy)-phenyl]carbamoyl}-1-piperazinecarboxylate with phosphorus pentoxide and phosphorus oxychloride, is described. The base compound and non-toxic acid addition salts are useful for their desirable effect on the central nervous system of warm-blooded animals.

8 Claims, No Drawings

2-CHLORO-11-(PIPERAZINYL)DIBENZ[B,F][1,4]OXAZEPINE AND ACID ADDITION SALTS THEREOF

This application is a continuation-in-part of our copending Application Ser. No. 551,544, filed May 20, 1966, now abandoned which is a continuation-in-part of Application Ser. No. 348,271, filed Feb. 28, 1964, now abandoned.

This application relates to novel pharmaceutical compounds. More particularly, it is concerned with novel pharmaceutical compounds and manner of utilization to produce a therapeutically desirable effect for a treatment of depressive states.

The present invention comprises compounds of the formula:

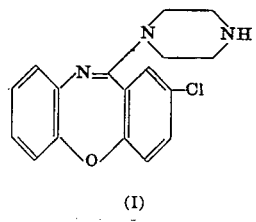

(I)

and non-toxic acid addition salts thereof.

The 2-chloro-11-(1-piperazinyl)dibenz[b,f][1,4]oxazepines of the present invention have been found to be highly active anti-depressant agents in warm-blooded animals. They show excellent anti-depressant action over a wide range of doses which are non-toxic and which do not produce undesirable symptoms. The anti-depressant properties of the compounds of the present invention tion are determined in several ways. For example, they readily counteract the depression induced in animals by the administration of tetrabenazine hexamate. Graded doses of the compounds of this invention are administered to groups of mice, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show the well known profound depression induced by tetrabenazine. The results from several dose levels are used to establish effective dose ranges. The anti-depressant compounds of this invention show their desirable properties by this procedure at dose levels which procedure no overt signs of stimulation or depression. These anti-depressant properties are, furthermore, evident at non-toxic dose levels.

When tested by these procedures, the novel base compound of the present invention shows anti-depressant activity in warm-blooded animals in the range of 0.4 to 50 mg./kg. when administered intraperitoneally to mice, and has a duration of action which lasts at least 6 hours. It is also active at 0.02 to 25 mg/kg. When administered orally. The lethal dose ($LD_{50}$) in warm-blooded animals such as mice is 122 mg./kg., administered intraperitoneally and 112 mg./kg. when administered orally, and this drug shows a wide margin of safety ($LD_{50}$ lowest active dose vs tetrabenazine is 305, intraperitoneally; and 560, orally). The results of the present compounds and a known homologue in the above test is summarized in the following table:

TABLE

REVERSAL OF TETRABENAZINE HEXAMATE DEPRESSION

| Compound | Range of Active Doses (mg./kg. Intraperitoneal) |
| --- | --- |
| Compound I | 0.4 – 50 |
| Compound II | 0.6 – 25 |
| Compound III | 1.6 – 25 |
| Compound IV | 0.8 – 25 |
| Compound V | 3.1 – 25 |
| Compound VI | Rejected at - 25 mg./kg. Rejected at - 0.2 mg./kg. |
| Compound I | 2-chloro-11-(1-piperazinyl)dibenz[b,f][1,4]-oxazepine, melting point 175°–176°C. |
| Compound II | 2-chloro-11-(1-piperazinyl)dibenz[b,f][1,4]-oxazepine fumarate, melting point 204°–2.6°C. |
| Compound III | 2-chloro-11-(1-piperazinyl)dibenz[b,f][1,4]-oxazepine maleate, melting point 195°–200°C. (decomposition). |
| Compound IV | 2-chloro-11-(1piperazinyl)dibenz [b,f][1,4]-oxazepine succinate, melting point 180°–181°C. |
| Compound V | 2-chloro-11-(1-piperazinyl)dibenz [b,f][1,4]-oxazepine diheptanoate, melting point 82°C. |
| Compound VI | 2-chloro-11-(4-methyl-1-piperazinyl) dibenz-[b,f][1,4]oxazepine, melting point 109°–111°C. |

In addition, the compounds of the present invention show other anti-depressant actions. For example, the base compound of this invention inhibits and reverses the hypothermic response to reserpine and enhances the lethal effect of yohimbine, This compound also prolongs the pressor response to norepinephrine and blocks phenethylamine.

A major difference between the base compound of this invention and a standard anti-depressant agent, imipramine, is that the base compound of this invention appears to be devoid of anticholinergic actions. In addition, the base compound of this invention does not demonstrate a biphasic response in its action as an inhibitor of tetrabenazine depression (i.e., no activity at high or depressant doses) as is found with imipramine. With the base compound of this invention this activity is present even at marked depressant doses; furthermore, this compound is not an anticonvulsant. On the basis of these findings it is expected that the dryness of the mouth, palpitations, blurred vision and uninary retention associated with the clinical use of a standard anti-depressive agent such as imipramine may be absent with the administration of the base compound of this invention.

Detailed safety evaluation studies in rats and dogs, including oral dosing for periods of 90 days to 1 year and longer, have shown no deleterious effects on gross or microscopic morphological examination that could be attributed to the long term administration of the base compound of this invention.

The base compound of this invention is a nearly colorless crystalline solid only slightly soluble in water, but readily soluble in organic solvents such as methanol, ethanol and paraffin hydrocarbons. It is a basic substance which is soluble in aqueous mineral acids at room temperature. It forms substantially insoluble acid addition salts such as the hydrochloride, sulfate, phosphate, citrate, tartrate, maleate, fumarate, etc. The present compound, generally in the form of its salts, may be administered orally or parenterally and when so administered produces a therapeutically desirable effect for the treatment of depressive states at individual doses from about 1 to about 50 milligrams. The dosage regimen can be adjusted to provide a therapeutic response. Thus, for example, several doses may be administered daily, or the dose may be reduced proportionately as indicated by the exigencies of the therapeutic situation. For therapeutic administration the active dibenzoxazepine, or salt, of this invention may be incorporated with excipients and used, for example, in the form of tablets, dragees, capsules, suppositories, liquids, elixirs, emulsions, suspensions, syrups, chocolate, candy, wafers, chewing gum, or the like. Such compositions and preparations should contain at least 0.1 percent dibenz-oxazepine or salt. The percentage in the compositions and preparations may, of course, be varied, and may conveniently be between about 2 percent and 60 percent or more of the weight of the unit. The amount of active dibenz-oxazepine, or salt, in such therapeutically useful anti-depressant compositions or preparations is such that a suitable dosage will be obtained. Preferred compositions or preparations using the compounds of the present invention are prepared so that a dosage unit form contains between about 1 and about 50 milligrams of the active dibenz-oxazepine or salt.

Tablets, pills, dragees, and the like may contain the following: a binder such as gum tragacanth, acacia, corn starch, or gelatin. A disintegrating agent such as corn starch, potato starch, alginic acid, or the like. A lubricant such as stearic acid, magnesium stearate, talc, or the like. A sweetening agent such as sucaryl or saccharin may be added, as well as a flavoring such as peppermint, oil of wintergreen or cherry flavoring.

The new 2-chloro-11-(1-piperazinyl)dibenz[b,f][1,4]-oxazepine of this invention may be prepared by a number of methods. One method is illustrated as follows:

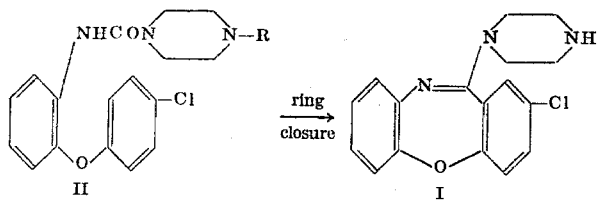

wherein R is hydrogen, carboalkoxy, carbobenzoyloxy, or benzyl. By this method, a 1-{[o-(p-chlorophenoxy)phenyl]-carbamoyl}-4-substituted-(R)-piperazine (II) is treated with a condensing agent such as phosphorus oxychloride, phosphorus pentachloride, polyphosphoric acid, zinc chloride, aluminum chloride and the like in the presence of an inert solvent. When blocking groups such as carbethoxy and the like (R) are present in the uncyclized intermediates (II), the conditions for the ring closure reaction and the subsequent isolation procedures are such that these groups are frequently hydrolyzed to the desired 4'-H-piperazine compound of this invention without further treatment. Alternately, such blocking groups (including carboalkoxy, carbobenzyloxy and benzyl) may be removed as a final step by methods well known to those skilled in the art, or the intermediate (II) wherein R is hydrogen may be cyclized directly.

The following examples describe in detail the synthesis of the base compound and formulations of various types of pharmaceutical preparations.

EXAMPLE 1

Preparation of 2-Chloro-11-(1-piperazinyl)dibenz[b,f][1,4]oxazepine

A mixture of 125 g. of o-(p-chlorophenoxy)aniline hydrochloride and 100 ml. of dry pyridine is treated cautiously with a solution of 90 ml. of ethyl chlorocarbonate in 150 ml. or ether. The mixture is kept at room temperature for 3 days, diluted with about 500 ml. of water and extracted with 300 ml. of ether. The ethereal extract is washed with 300 ml. of water, dried over calcium chloride, filtered and concentrated. The resulting ethyl o-(p-chlorophenoxy)carbanilate is obtained in a viscous oil suitable for use in the next step without further purification.

A solution of 70 g. of ethyl o-(p-chlorophenoxy)carbanilate and 120 g. of N-carbethoxypiperazine in 100 ml. of benzene containing a little sodium methoxide is heated on a steam bath for about 5 days. The solvent is removed by distillation and the residue is triturated with water. The resulting solid is dissolved in ether and dried over sodium sulfate. Filtration and concentration then yields ethyl 4-{[o-(p-chlorophenoxy)-phenyl]carbamoyl}-piperazinecarboxylate, melting at 89°–91° C., and suitable for cyclization.

A mixture of 10 g. of the above piperazine carboxylate ester, 8 g. of phosphorus pentoxide and 20 ml. of phosphorus oxychloride is heated under reflux for about 1 day, diluted with 100 ml. each of chloroform and benzene and quenched with 200 g. of ice. The mixture is made basic with 10% sodium hydroxide. The organic layer is isolated and extracted with 150 ml. of dilute hydrochloric acid. The product is precipitated from the aqueous layer by addition of 10 percent sodium hydroxide, extracted with benzene and dried over potassium carbonate. Recrystallization from benzene-petroleum ether gives 2-chloro-11-(1-piperazinyl)-dibenz[b,f][1,4]oxazepine which melts at 175°–176° C.

The above free base is dissolved in ethyl acetate, and a solution of fumaric acid in ethyl acetate is added, to give 2-chloro-11-(1-piperazinyl)dibenz[b,f][1,4]oxazepine fumarate.

The above free base is dissolved in ether and the theoretical amount of alcoholic hydrogen chloride is added. The compound 2-chloro-11-(1-piperazinyl)dibenz[b,f][1,4]oxazepine hydrochloride is obtained.

The above free base is dissolved in ethyl acetate and a solution of sulfuric acid in ethyl acetate is added, to give 2-chloro-11-(1-piperazinyl)dibenz[b,f][1,4]oxazepine sulfate. Other salts were prepared in a similar manner and some are shown in the table hereinbefore.

EXAMPLE 2

| Per Tablet: | | For 10,000 Tablets |
|---|---|---|
| 0.005 g. | Active ingredient: 2-Chloro-11- | 50. g. |

|  |  |  |
|---|---|---|
| 0.080 | (1-piperazinyl)dibenz[b,f][1,4]-oxazepine Lactose | 800. |
| 0.010 | Corn Starch (For Mix) | 100. |
| 0.008 | Corn Starch (For Paste) | 75. |
| 0.103 g. | Total | 1025. g. |
| 0.001 | Magnesium Stearate (1%) | 10. |
| 0.104 g. | Total | 1035. g. |

The active ingredient, lactose and corn starch (for mix) are blended together. The corn starch (for paste) is suspended in 600 ml. of water, and heated with stirring, to form a paste. This paste is then used to granulate the mixed powders. Additional water is used, if necessary. The wet granules are passed wafer a No. 8 hand screen and dried at 120° F. The dry granules are then passed through a No. 16 screen. The mixture is lubricated with 1 percent magnesium stearate and compressed into tablets in a suitable tableting machine.

EXAMPLE 3

| Per Tablet |  | For 10,000 Tablets |
|---|---|---|
| 0.010 g. | Active ingredient: 2-Chloro-11-(1-piperazinyl)dibenz[b,f]-[1,4]oxazepine | 100. g. |
| 0.080 | Lactose | 800. |
| 0.015 | Corn Starch (For Mix) | 150. |
| 0.010 | Corn Starch (For Paste) | 100. |
| 0.115 g. | Total | 1150. g. |
| 0.001 | Magnesium Stearate (1%) | 12. |
| 0.116 g. | Total | 1162. g. |

The active ingredient, lactose and corn starch (for mix) are blended together. The corn starch (for paste) is suspended in 600 ml. of water, and heated, with stirring, to form a paste. This paste is then used to granulate the mixed powders. Additional water is used, if necessary. The wet granules are passed through a No. 8 hand screen and dried at 120° F. The dry granules are then passed through a No. 16 screen. The mixture is lubricated with 1 percent magnesium stearate and compressed into tablets in a suitable tableting machine.

What is claimed is:

1. A compound of the formula:

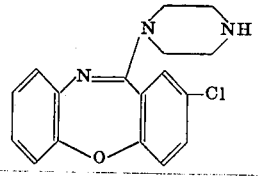

and the non-toxic acid addition salts thereof.

2. The compound according to claim 1 in which the salt is the hydrochloride.
3. The compound according to claim 1 in which the salt is the fumarate.
4. The compound according to claim 1 in which the salt is the sulfate.
5. The compound according to claim 1 in which the salt is the maleate.
6. The compound according to claim 1 in which the salt is the succinate.
7. The compound according to claim 1 in which the salt is the diheptanoate.
8. The compound according to claim 1; 2-chloro-11-(1-piperazinyl)dibenz[b,f][1,4]oxazepine.

* * * *